United States Patent Office 3,232,077
Patented Feb. 1, 1966

3,232,077
CLUTCH DISC
Richard Binder, Schweinfurt (Main), Germany, assignor to Fichtel & Sachs A.G., Schweinfurt (Main), Germany
Filed Jan. 7, 1963, Ser. No. 249,834
Claims priority, application Germany, Jan. 9, 1962, F 35,732
10 Claims. (Cl. 64—27)

The invention relates to clutch discs for clutches which are suitable for use in motor vehicles, and more particularly to such clutch discs which are provided with vibration damping means.

It is known to incorporate resilient rubber elements in clutch members in order to reduce the transmission of torsional vibrations. However, the assembly of such known discs was rather complicated and expensive, and such discs had other drawbacks which operated against their general acceptance.

It is a principal object of the invention to provide, in a clutch disc of the character described, a simple and economic assemblage of the resilient element to the hub member, which eliminates the drawbacks recited above and takes up very little space.

It is a further object of the invention to provide such a clutch disc with a simple and reliable means to limit angular deflection.

Still a further object of the invention is to provide additional frictional damping means which can be made with a minimum of cost.

The clutch disc of the invention comprises a hub member, an outer annular member with a rim carrying the friction lining, and between said two members an annular resilient body, preferably in the shape of a double truncated cone, which is made of an elastic material such as natural or synthetic rubber and serves as the vibration damping element. The rubber body is sandwiched between inner and outer metal sleeves to which it is surface bonded and vulcanized. For the sake of brevity, said rubber sandwich will be designated as rubber element throughout the following description.

The inner sleeve or sleeves of the rubber element conform substantially to the outer circumference of the hub members of the clutch disc and are mounted thereon by means of rings forced under tension in between hub and sleeve. This kind of press-fit assemblage allows of separately manufacturing the rubber element, and provides a simple and compact design where very little space is required for joining the members comprising the finished disc. The separate production of the rubber element makes it further possible to ream the inner sleeve of the rubber element after vulcanization and to place thereby the rubber under compression required for an extended useful life of the clutch.

The torsional strength of the junction between the hub of the disc and the rubber element may be increased by using rings provided with the inner and/or outer teeth. Such toothed rings are preferably bent or rolled from flat sheet material in which the teeth have been provided by stamping or bending prior to the rolling operation.

The outer sleeves of the rubber element carry the friction rings of the clutch discs.

Joining the rubber element and the hub as set forth above makes it possible to apply further improvements to the clutch disc. One such improvement consists in providing the hub body with a thin flange and to arrange at either side of said flange twin annular rubber elements; in order to limit the angular deflection, said flange is provided with recesses engaging projections located at outer fastening means of the rubber element or at members connecting said outer fastening means.

If two annular rubber elements are used, they may be made unequal in such a way that one of the outer sleeves is forced against the flange and produces a friction moment, whereby friction material may be interposed.

The invention will now be described in greater detail with reference to the accompanying drawings, which show, by way of example, two embodiments of the invention.

Figure 1:
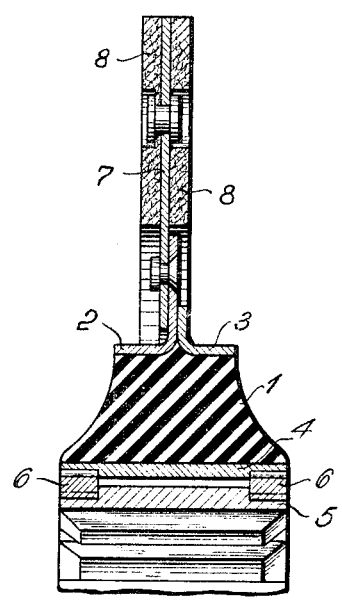
FIG. 1 is an elevational view of a clutch disc incorporating vibration damping means according to the invention but without means limiting the angular deflection of said damping means.
Figure 4:
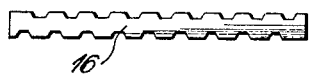
FIG. 4 is a plan view of a flat band for the manufacture of a fastening ring according to the invention, which has already received the teeth by stamping or other non-cutting procedures.

In the embodiment of the invention shown in FIG. 1, the vibrtion damping clutch disc does not have menas for limiting the angular deflection. The outer periphery of the rubber body 1 is vulcanized to two angular rings 2 and 3, and a clutch disc 7 provided with friction linings 8 is bolted to the projecting face of ring 2. The inner surface of the rubber body 1 is bonded to a sleeve 4 which is rigidly joined to the hub 5 by means of the press-fitted rings 6, which are preferably provided at their outer and inner periphery with notches or teeth. FIG. 4 shows a flat piece of material 16 as it is used for the manufacture of such rings 6.

Figure 2:
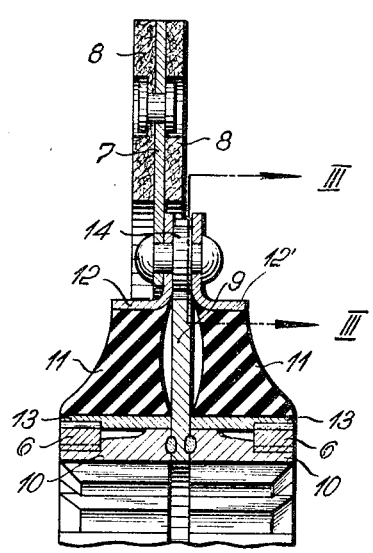
FIG. 2 is a similar view of FIG. 1 of a clutch disc provided with means limiting the angular deflection.

Referring to FIG. 2, a modification is illustrated in which the rubber element consists of two halves 11 and where the hub 10 is provided with a flange 9 which has a diameter of substantially the same size as the angular rings 12 and 12'. The two rubber elements 11 are joined to the hub 10 by means of the ring 6, as shown in FIG. 1.

Figure 3:
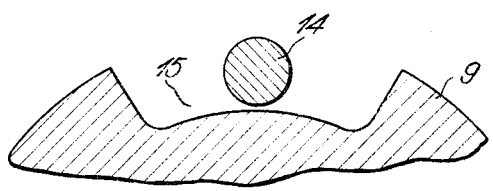
FIG. 3 is a cross-sectional view taken along line III—III of FIG. 2.

The flange 9 is provided with recesses 15 which engage connecting members 14 (FIG. 3) which rivet the two angular rings 12 and 12' and preferably also the disc 7 together. The width of the recesses limits the angular deflection, and accordingly the stresses in the rubber element, to a predetermined maximum. This construction of the damping means has the further advantage to maintain the clutch in operative condition even though the rubber bodies may break or get torn from their sleeves, because the torque is still transmitted over the connecting members 14 and the flange 9. The connecting members 14 have preferably a thickness so as to leave between the flange 9 and the lateral faces of the angular rings 12 and 12' only a small play of a few tenths of a millimeter. This presents the advantage that the running precision of the clutch disc at the friction surfaces is determined not only by the rubber elements, which have also a considerably lateral resilience, but essentially by the flange 9. The outer rim of such a clutch disc maintains its accurate position during operation much better than the rim of the modification of FIG. 1 or of other clutches provided with vibration damping means.

Figure 6:
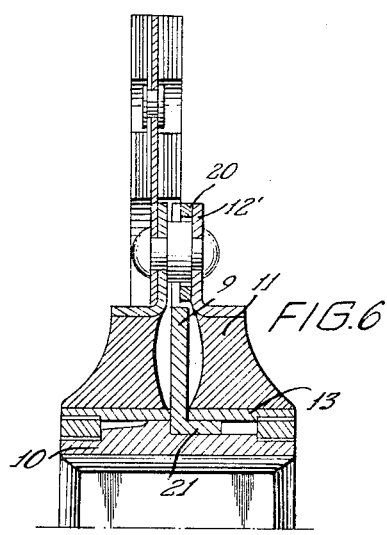
FIG. 6 is an elevational view, similar to FIG. 2 of a slightly modified form of the clutch disc.
Figure 5:
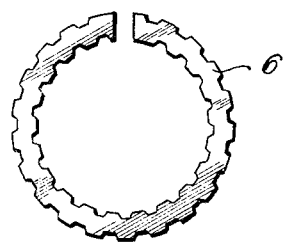
FIG. 5 shows the ring made from the band of FIG. 4 by bending or rolling.

The damping means illustrated in FIG. 2 allows of producing in a very simple manner an additional frictional damping effect. For this purpose, the two rubber bodies 11 may be made unequal so as to produce a lateral pressure on the angular rings 12 or 12' and to force the lateral face of either of said rings against the flange 9, thereby obtaining the desired moment of friction. In order to produce favorable frictional relationships at least a portion of the frictionally engaging members may be phosphatized or friction material may be disposed between said members and preferably cemented to one of them. FIG. 6 shows a slightly modified form of the clutch disc where a friction lining 20 is provided between annular ring 12' and flange member 9 and wherein said flange member 9 is inserted at 21 with press-fit into the hub.

The division of the rubber body 1 into two parts 11, as shown in FIG. 2, has a further advantage.. As a result of the spacing of the flange 9 from the angular rings 12 and 12', an air current is passed between the two rubber elements 11, which produces a certain cooling effect.

For reasons of economy, the hub of the clutch disc shown in FIG. 2, is assembled from three parts, two tubular pieces 10 being welded to the flange 9. It is, of course, also possible to press the flange 9 onto a one-piece hub body; hereby, the flange portion entering the bore in the hub is preferably toothed to prevent rotational displacement of the two parts with respect to each other.

I claim:

1. A clutch disc comprising a hub, an inner tubular sleeve and an outer annular member coaxial with, and surrounding, said hub, a rim carrying a friction facing secured to said outer annular member, a resilient rubber element arranged between said tubular sleeve and said outer annular member and bonded to said sleeve and member, and at least one ring inserted with press-fit between said hub and sleeve in direct contact therewith and joining said rubber element to said hub.

2. A clutch disc as claimed in claim 1 wherein said ring is provided with teeth at least at one of its circumferences.

3. A clutch disc as claimed in claim 2 wherein said ring is made from flat material and said teeth are made without cutting in said material prior to the ring forming operation.

4. A clutch disc comprising a hub, a flange projecting radially outwardly from said hub, recesses in the periphery of said flange, on each side of said flange on inner tubular sleeve and an outer annular member coaxial with, and surrounding said hub, resilient rubber elements arranged between said tubular sleeves and said outer annular members and bonded thereto, at least one ring inserted with press fit between said hub and sleeves and joining said rubber elements to said hub, a rim carrying a friction facing secured to one of said outer annular members, and stop means engaging said recesses and thus limiting the angular deflection of the rubber elements.

5. A clutch disc as claimed in claim 4 wherein said stop means are axial projections at least at one of said outer annular members.

6. A clutch disc as claimed in claim 4 wherein said stop means are members axially connecting said outer annular members.

7. A clutch disc as claimed in claim 4 wherein at least one of said rubber elements is placed by said flange under tension, thereby forcing said outer annular member bonded thereto in contact against said flange, producing friction.

8. A clutch disc as claimed in claim 7 comprising a friction lining between said contacting annular member and flange.

9. A clutch disc as claimed in claim 4 wherein said flange is welded to said hub.

10. A clutch disc as claimed in claim 4 wherein said flange is press-fitted into said hub.

References Cited by the Examiner

UNITED STATES PATENTS

| | | | |
|---|---|---|---|
| 1,896,968 | 2/1933 | Paton. | |
| 1,997,021 | 4/1935 | Spase. | |
| 2,065,601 | 12/1936 | Meyer. | |
| 2,158,244 | 5/1939 | Mistretta et al. | |
| 2,491,734 | 12/1949 | Hirst | 64—27 X |
| 2,731,814 | 1/1956 | Gunkel | 64—30 |
| 2,927,674 | 3/1960 | Everitt | 64—11 |

FOREIGN PATENTS 851,865   10/1952   Germany.

BROUGHTON G. DURHAM, *Primary Examiner.*

ROBERT C. RIORDON, *Examiner.*